US011706225B1

(12) United States Patent
Twombly et al.

(10) Patent No.: US 11,706,225 B1
(45) Date of Patent: Jul. 18, 2023

(54) SYSTEM FOR SOURCE INDEPENDENT BUT SOURCE VALUE DEPENDENT TRANSFER MONITORING

(71) Applicant: BANK OF AMERICA CORPORATION, Charlotte, NC (US)

(72) Inventors: Steven Michael Twombly, Saco, ME (US); Sara A. Walsh, West Chester, PA (US); Tony England, Tega Cay, SC (US); Robertson Walters Greenbacker, Charlotte, NC (US); Bradley Ryan Holland, Huntersville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/734,619

(22) Filed: May 2, 2022

(51) Int. Cl.
  *H04L 47/762* (2022.01)
  *H04L 9/40* (2022.01)
  *H04L 47/78* (2022.01)
  *H04L 47/70* (2022.01)

(52) U.S. Cl.
  CPC .......... *H04L 63/102* (2013.01); *H04L 47/762* (2013.01); *H04L 47/781* (2013.01); *H04L 47/828* (2013.01)

(58) Field of Classification Search
  CPC ... H04L 63/102; H04L 47/762; H04L 47/781; H04L 47/828
  USPC ................. 709/218, 219, 220, 224, 228, 229
  See application file for complete search history.

(56) References Cited

U.S. PATENT DOCUMENTS

| 6,128,603 | A | 10/2000 | Dent et al. |
|---|---|---|---|
| 8,078,538 | B1 | 12/2011 | Buch et al. |
| 8,316,237 | B1 | 11/2012 | Felsher et al. |
| 8,626,113 | B2 * | 1/2014 | Banjo ................. H04L 12/1417 |
| | | | 455/406 |
| 8,843,997 | B1 | 9/2014 | Hare |
| 8,866,701 | B2 | 10/2014 | Momchilov et al. |
| 9,002,018 | B2 | 4/2015 | Wilkins et al. |
| 9,049,010 | B2 | 6/2015 | Jueneman et al. |

(Continued)

FOREIGN PATENT DOCUMENTS

CA      2786095 A1 *  9/2013  ............... G06F 8/65

*Primary Examiner* — Khanh Q Dinh
(74) *Attorney, Agent, or Firm* — Moore & Van Allen PLLC; Kaity Y. Emerson

(57) ABSTRACT

Systems, computer program products, and methods are described herein for source independent but source value dependent transfer monitoring. The invention is configured to receive a processing request to initiate a processing network session, wherein the processing network session is associated with the processing of a first activity; receive, a processing interaction request to access a first resource associated with the user; extract a resource processing value associated with the first activity from the processing parameter data structure; determine whether the resource processing value is associated with triggering at least one block intervention step; block the entity input device from accessing the first resource in response to determining that the resource processing value is associated with triggering the at least one block intervention step during processing of the first activity; transmit a block notification to the entity input device; and trigger display of a success notification at an end-user application.

20 Claims, 5 Drawing Sheets

(56) References Cited

U.S. PATENT DOCUMENTS

| | | |
|---|---|---|
| 9,177,169 B2 | 11/2015 | Shablygin et al. |
| 9,210,169 B2 * | 12/2015 | Wong .................. G06F 21/6218 |
| 9,705,817 B2 | 7/2017 | Lui et al. |
| 9,712,486 B2 | 7/2017 | Johnson et al. |
| 9,769,169 B2 * | 9/2017 | Khosravi ............. G06F 21/606 |
| 10,007,910 B2 | 6/2018 | von Mueller et al. |
| 10,021,062 B2 | 7/2018 | LeVasseur et al. |
| 10,069,826 B2 * | 9/2018 | Khosravi ............. H04L 63/0876 |
| 10,432,627 B2 * | 10/2019 | Khosravi ............. G06F 21/606 |
| 10,607,484 B2 | 3/2020 | Yang et al. |
| 10,997,190 B2 | 5/2021 | Porath et al. |
| 11,126,613 B2 | 9/2021 | Ow et al. |
| 11,201,835 B1 * | 12/2021 | Roberts .................. H04L 47/41 |
| 2003/0126076 A1 | 7/2003 | Kwok et al. |
| 2003/0144866 A1 | 7/2003 | Pagliar et al. |
| 2003/0158811 A1 | 8/2003 | Sanders et al. |
| 2003/0182227 A1 | 9/2003 | Guzman |
| 2003/0229586 A1 | 12/2003 | Repak |
| 2004/0185830 A1 | 9/2004 | Joao et al. |
| 2004/0209596 A1 | 10/2004 | Wong et al. |
| 2004/0267663 A1 | 12/2004 | Karns et al. |
| 2005/0044043 A1 | 2/2005 | Gooding et al. |
| 2006/0080263 A1 | 4/2006 | Willis et al. |
| 2006/0131385 A1 | 6/2006 | Kim |
| 2008/0021787 A1 | 1/2008 | MacKouse |
| 2009/0177562 A1 | 7/2009 | Peace et al. |
| 2011/0218918 A1 | 9/2011 | Peace et al. |
| 2012/0290482 A1 | 11/2012 | Atef et al. |
| 2013/0254885 A1 * | 9/2013 | Devost .................... G06F 21/56 726/23 |
| 2017/0093852 A1 * | 3/2017 | Khosravi ............ H04L 63/0876 |
| 2017/0132633 A1 | 5/2017 | Whitehouse |
| 2018/0026981 A1 * | 1/2018 | Khosravi ............ H04L 63/0876 726/7 |
| 2018/0247303 A1 | 8/2018 | Raj et al. |
| 2018/0300722 A1 | 10/2018 | Matthews |
| 2019/0014113 A1 * | 1/2019 | Khosravi ............ H04L 63/0861 |
| 2019/0333059 A1 | 10/2019 | Fallah et al. |
| 2020/0034837 A1 | 1/2020 | Narayan et al. |
| 2020/0058027 A1 | 2/2020 | Samitt et al. |
| 2020/0211006 A1 | 7/2020 | Ozvat et al. |
| 2020/0234287 A1 | 7/2020 | Cronic et al. |
| 2021/0294801 A1 | 9/2021 | Pal et al. |
| 2021/0314395 A1 | 10/2021 | Basu et al. |
| 2022/0014554 A1 * | 1/2022 | Vasu ...................... G06N 3/045 |
| 2022/0321540 A1 * | 10/2022 | Loman .................... H04L 63/20 |

* cited by examiner

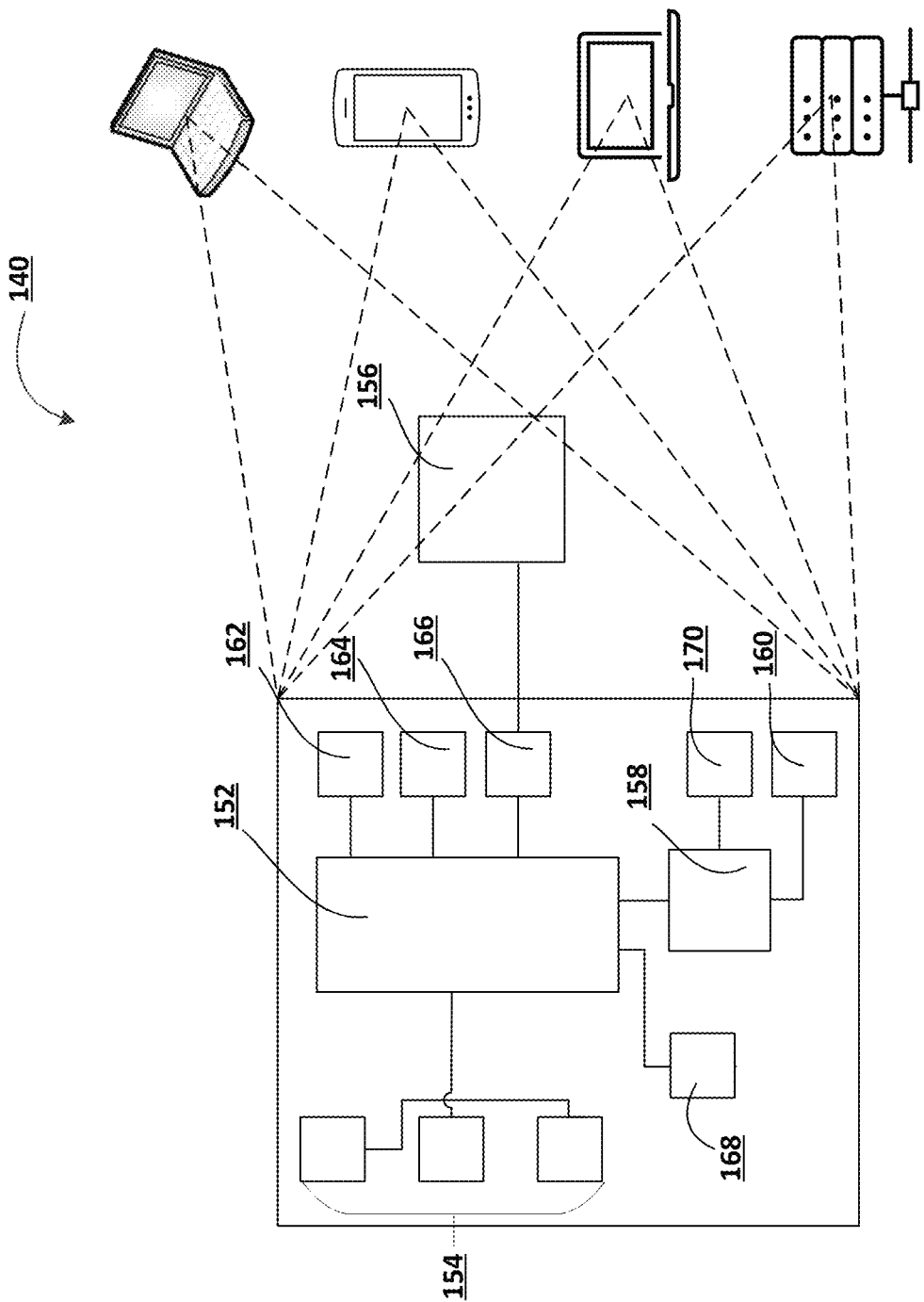

SYSTEM FOR SOURCE INDEPENDENT BUT SOURCE VALUE DEPENDENT TRANSFER MONITORING

FIELD OF THE INVENTION

The present invention embraces a system for source independent but source value dependent transfer monitoring.

BACKGROUND

Users take advantage of the convenience associated with recurring resource processing commitments from various sources. At times, as a result of multiple, recurring resource processing commitments, users may forget or are unaware of the purpose of such recurring resource processing commitments and lose track of their resource usage planning. Further, users may be enrolled in more than one recurring resource processing commitment from a single source. At times, users face challenges when attempting to cease recurring resource processing commitments. As such, users would benefit from having additional security to control access to their resources. There is a need for a way to allow users to dynamically and securely block unauthorized activities from third parties related to the user's account resources. Therefore, a need exists for a new process to assist users to monitor independently and potentially update preferences, as such process is not available in the conventional servicing system.

The previous discussion of the background to the invention is provided for illustrative purposes only and is not an acknowledgement or admission that any of the material referred to is or was part of the common general knowledge at the priority date of the application.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

The present disclosure is directed to a system for source independent but source value dependent transfer monitoring. The user may determine that it requires additional security and monitoring products and/or services with respect to the user's resources. In this regard, the user may define certain events that may trigger the system to continuously monitor the user's activity related to a user's resources. The system may further detect user activity and requests from third parties to access the user's resources, which may trigger the transmission of electronic alerts sent to computing devices of the user and/or third parties attempting to access the user's resources.

Embodiments of the present invention comprise systems, methods, and computer program products that address these and/or the foregoing deficiencies of conventional systems. Embodiments address the foregoing identified needs and provide improvements to existing technology by providing an innovative system, method and computer program product for source independent but source value dependent transfer monitoring. Typically, the system may comprise at least one non-transitory storage device and at least one processor coupled to the at least one non-transitory storage device. The processor may be configured to electronically receive, from an entity input device and via an entity application, a first processing request to initiate a first processing network session, wherein the first processing network session is associated with the processing of a first activity associated with a user; establish the processing network session with the entity input device via the entity application in response to the processing request; electronically receive, via the processing network session, a processing interaction request to access a first resource of one or more resources associated with the user; prompt the entity input device to provide one or more processing parameter data structures associated with the interaction request; extract a resource processing value associated with the first activity from the processing parameter data structure; determine whether the resource processing value associated with the processing interaction request is associated with triggering at least one block intervention step during processing of the first activity; block the entity input device from accessing the first resource in response to determining that the resource processing value is associated with triggering the at least one block intervention step during processing of the first activity; transmit a block notification to the entity input device; and trigger display of a success notification at an end-user application associated with a user input device.

In some embodiments, or in combination with any of the previous embodiments, the at least one processor is further configured to electronically receive, from the user input device and via the end-user application, a security update request from the user to initiate a security update network session; establish the security update network session with the user input device via the end-user application in response to the security update request; electronically receive, via the security update network session, a network request to block access to one or more resources associated with the user for one or more activities that are associated with the at least one block intervention step; prompt, via the security update network session, the user input device to provide a first blocking trigger value associated with the at least one block intervention step; electronically receive, via the security update network session, the first blocking trigger value associated with the at least one block intervention step from the user at a first time interval; and store the first blocking trigger value associated with the at least one block intervention step in a database.

In some embodiments, or in combination with any of the previous embodiments, determining whether the resource processing value is associated with the first blocking trigger value associated with the at least one block intervention step during processing of the first activity comprises extracting the first blocking trigger value from the database; and identifying whether the extracted first blocking trigger value input by the user at the first time interval preceding a second time interval matches the resource processing value.

In some embodiments, or in combination with any of the previous embodiments, determining whether the resource processing value is associated with the first blocking trigger value associated with the at least one block intervention step during processing of the first activity comprises identifying a successful match between the extracted resource processing value and the first blocking trigger value; blocking the entity input device from accessing the first resource in response to identifying the successful match between the extracted resource processing value and the first blocking trigger value; and transmitting the block notification to the entity input device.

In some embodiments, or in combination with any of the previous embodiments, the at least one processor is further configured to continuously monitor requests to block access from the user input device.

In some embodiments, or in combination with any of the previous embodiments, the at least one processor is further configured to electronically receive, via the security update network session and the user input device and via the end-user application, a second blocking trigger value associated with the at least one block intervention step; and store the second blocking trigger value associated with the at least one block intervention step in the database.

In some embodiments, or in combination with any of the previous embodiments, the at least one processor is further configured to electronically receive, from an entity input device and via an entity application, a second processing request to initiate a second processing network session, wherein the second processing network session is associated with the processing of a second activity associated with a user; establish the second processing network session with the entity input device via the entity application in response to the second processing request; electronically receive, via the second processing network session, a second processing interaction request to access a first resource of one or more resources associated with the user; prompt the entity input device to provide one or more processing parameter data structures associated with the interaction request; extract a resource processing value associated with the second activity from the processing parameter data structure; determine whether the resource processing value associated with the second processing interaction request is associated with triggering at least one block intervention step during processing of the second activity; allow the entity input device to access the first resource in response to determining that the resource processing value is associated with triggering the at least one block intervention step during processing of the second activity; transmit a confirmation notification to the entity input device; and trigger display of a completion notification at the end-user application associated with the user input device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
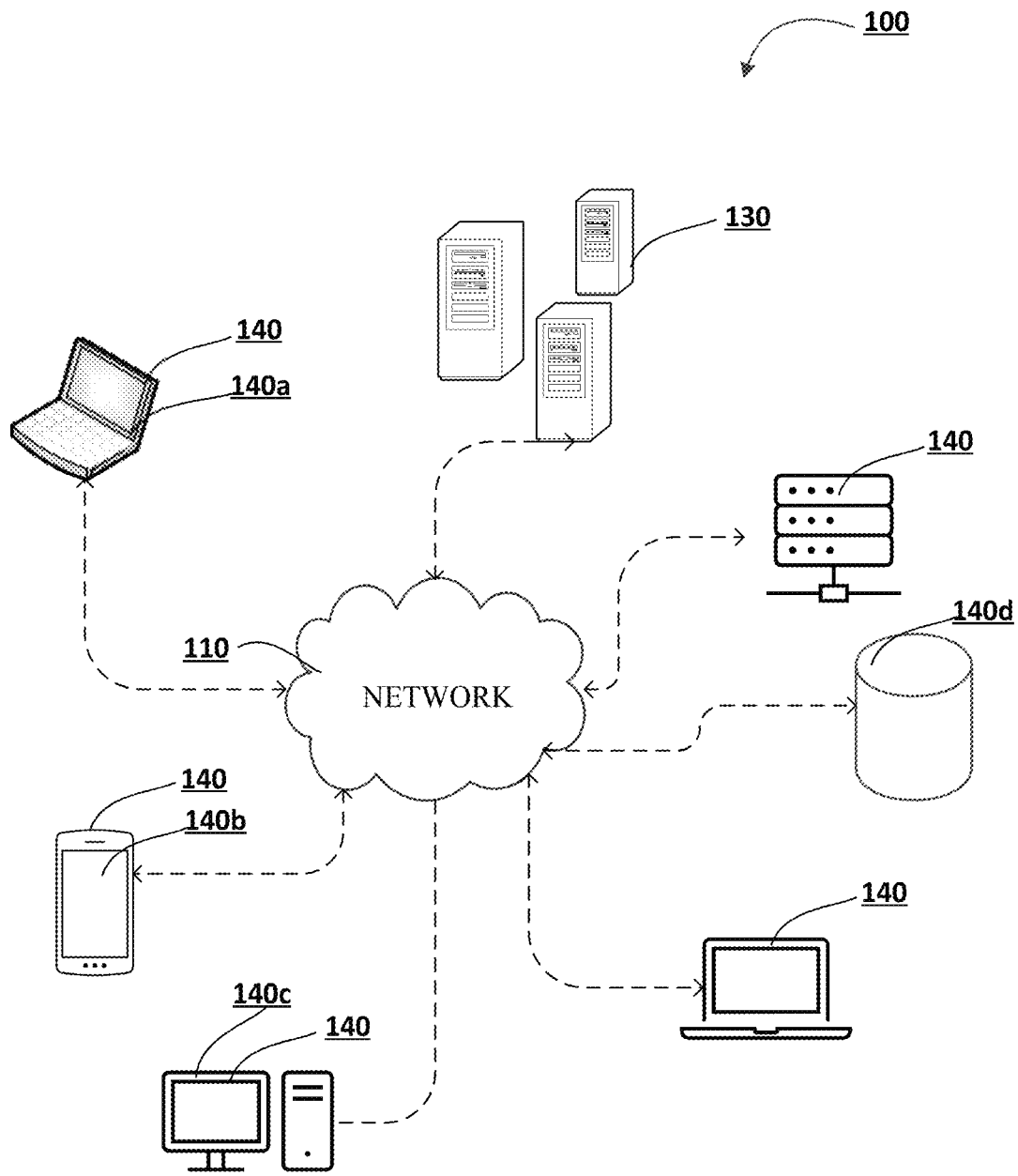
Figure 1B:
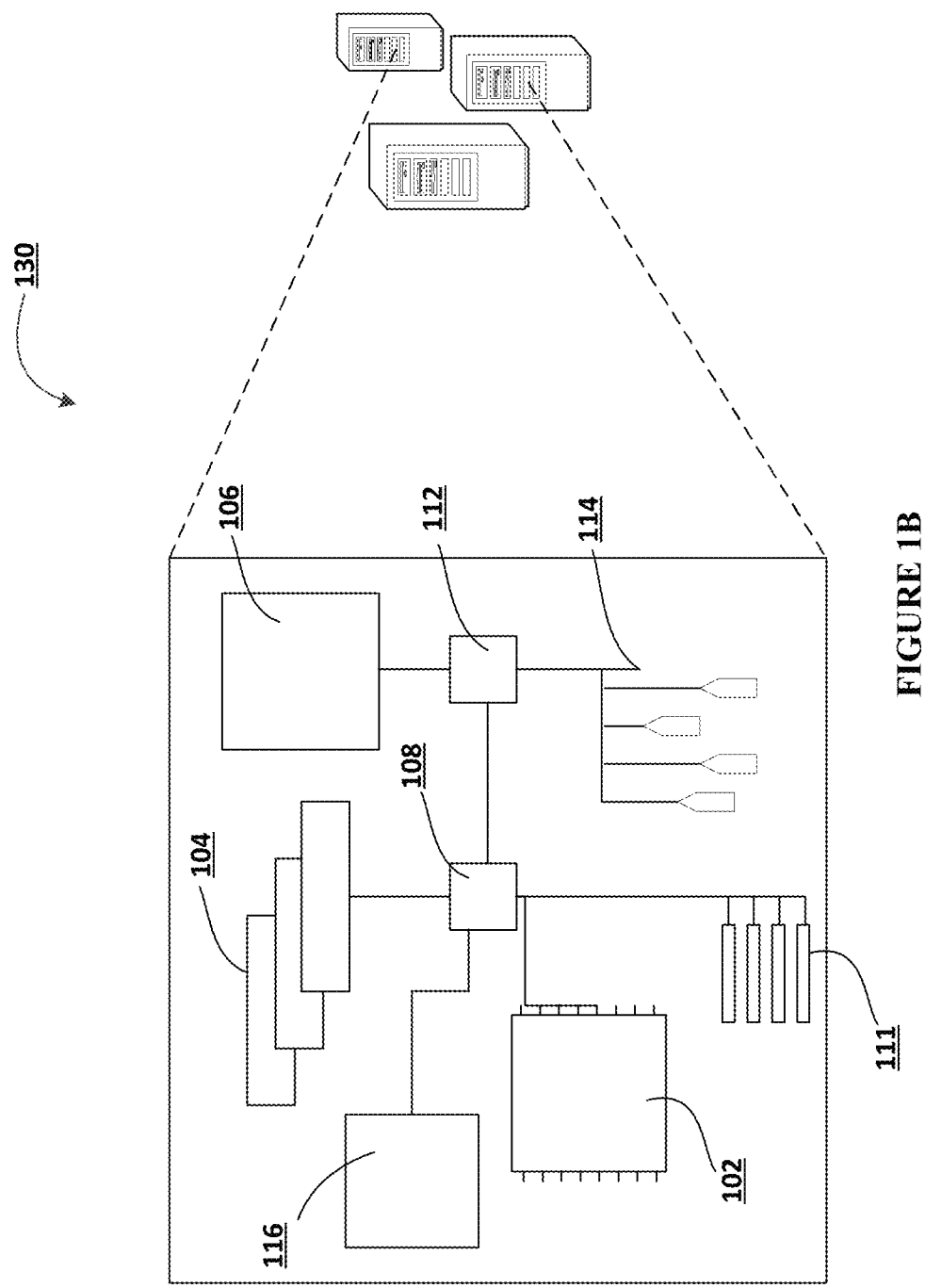

Having thus described embodiments of the invention in general terms, reference will now be made the accompanying drawings, wherein:

FIGS. 1A-1C illustrates technical components of an exemplary distributed computing environment 100 for source independent but source value dependent transfer monitoring, in accordance with an embodiment of the invention.

Figure 2:
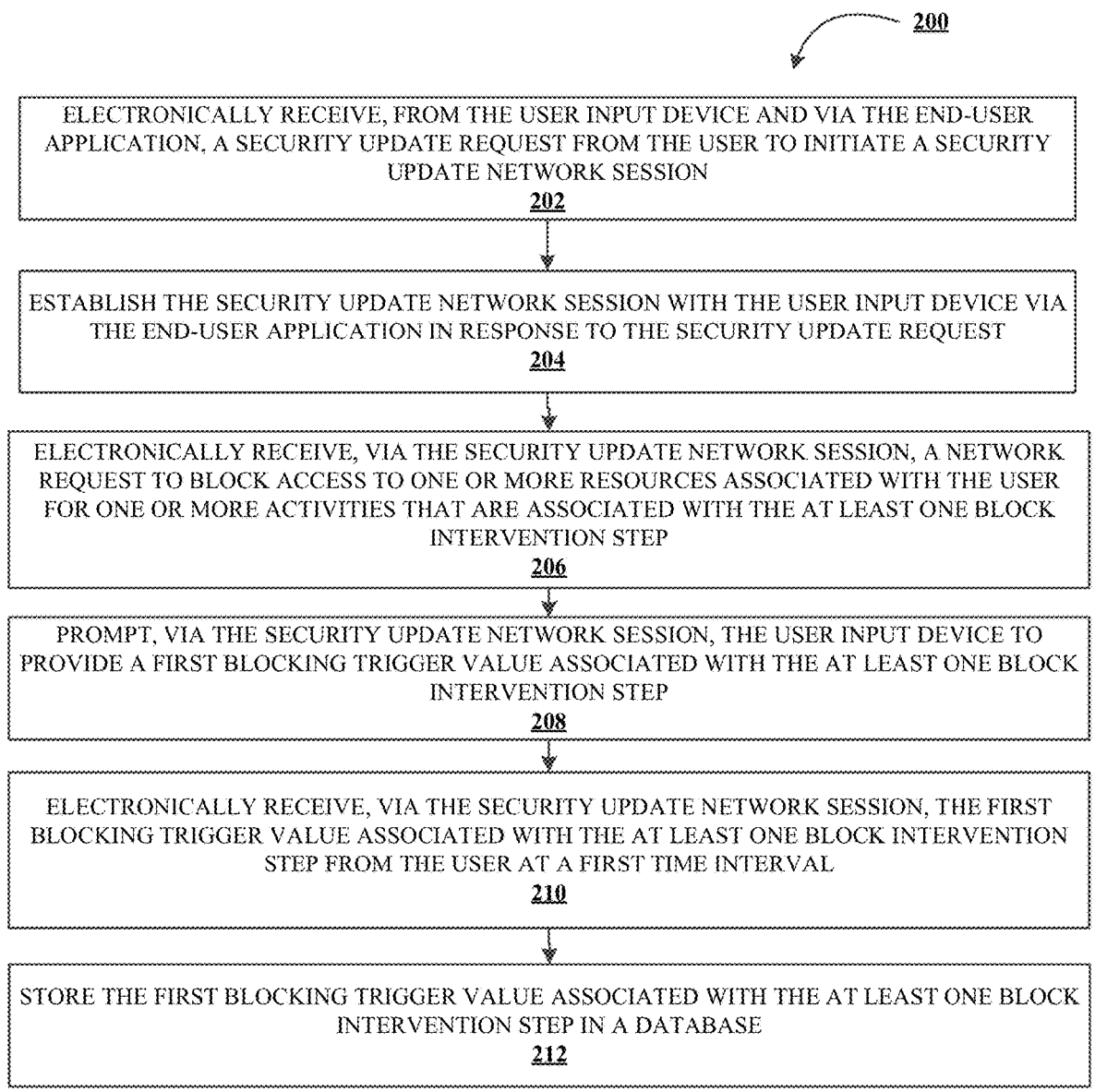

FIG. 2 illustrates a process flow 200 for user registration for source independent but source value dependent transfer monitoring, in accordance with an embodiment of the invention.

Figure 3:
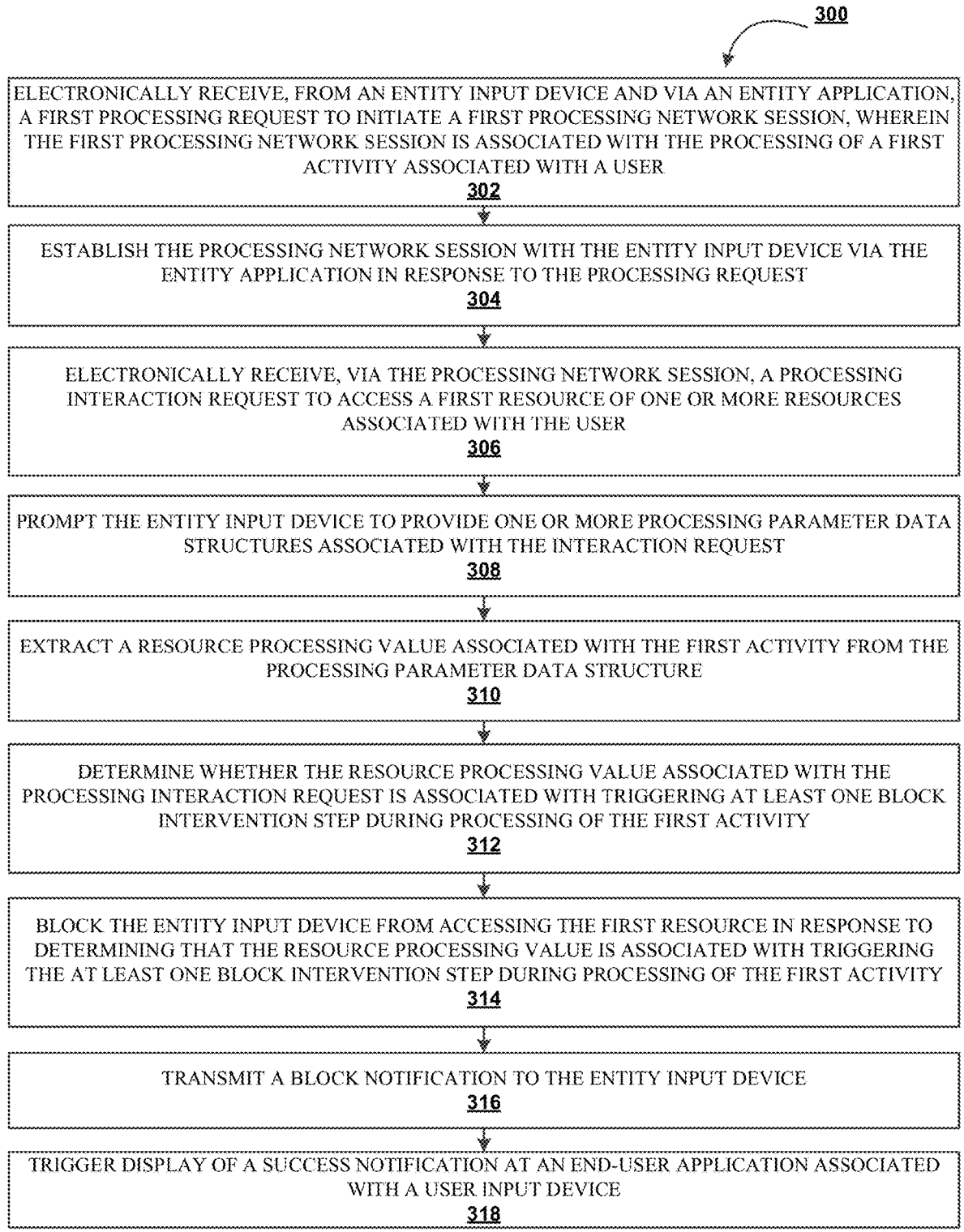

FIG. 3 illustrates a process flow 300 for source independent but source value dependent transfer monitoring, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, the data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, information associated with the user, or the like. The technology resource is typically associated with and/or maintained by an entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event", "point of transaction event", "interaction" or "activity" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

A "point-of-transaction" could refer to any location, virtual location or otherwise proximate occurrence of a transaction. A "point-of-transaction device" may refer to any device used to perform a transaction, either from the user's perspective, the merchant's perspective or both. In some embodiments, the point-of-transaction device refers only to a user's device, in other embodiments it refers only to a user device, and in yet other embodiments, it refers to both a customer device and a user device interacting to perform a transaction. For example, in one embodiment, the point-of-transaction device refers to the user's mobile device configured to communicate with a customer device, whereas in other embodiments, the point-of-transaction device refers to a terminal configured to communicate with a user's mobile device and customer's mobile device, and in yet other embodiments, the point-of-transaction device refers to both.

In some embodiments, a point-of-transaction device is or includes an interactive computer terminal that is configured to initiate, perform, complete, and/or facilitate one or more transactions. A point-of-transaction device could be or include any device that a user may use to perform a transaction with an entity, such as, but not limited to, an ATM, a loyalty device such as a rewards card, loyalty card or other loyalty device, a magnetic-based payment device (e.g., a credit card, debit card, or the like), a personal identification number (PIN) payment device, a contactless payment device (e.g., a key fob), a radio frequency identification device (RFID) and the like, a computer, (e.g., a personal computer, tablet computer, desktop computer, server, laptop, or the like), a mobile device (e.g., a smartphone, cellular phone, personal digital assistant (PDA) device, MP3 device, personal GPS device, or the like), a merchant terminal, a self-service machine (e.g., vending machine, self-checkout machine, or the like), a public and/or business kiosk (e.g., an Internet kiosk, ticketing kiosk, bill pay kiosk, or the like), and/or various combinations of the foregoing.

In some embodiments, a point-of-transaction device is operated in a public place (e.g., on a street corner, at the doorstep of a private residence, in an open market, at a public rest stop, or the like). In other embodiments, the point-of-transaction device is additionally or alternatively operated in a place of business (e.g., in a retail store, post office, banking center, grocery store, factory floor, or the like). In accordance with some embodiments, the point-of-transaction device is not owned by the user of the point-of-transaction device. Rather, in some embodiments, the point-of-transaction device is owned by a mobile business operator or a point-of-transaction operator (e.g., merchant, vendor, salesperson, or the like). In yet other embodiments, the point-of-transaction device is owned by the financial institution offering the point-of-transaction device providing functionality in accordance with embodiments of the invention described herein.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

Typically, users are subject to recurring resource processing commitments from various sources. Often, as a result of the multiple, recurring resource processing commitments, users are unaware of the purpose of such recurring resource processing commitments and lose control of their resource usage planning. Further, users may be subject to more than one recurring resource processing commitment from a single source. Typically, users face challenges when attempting to cease recurring resource processing commitments. As such, users seek additional security to control access to user resources. There is a need for a way to allow users to dynamically and securely block unauthorized activities from third parties related to the user's account resources. Therefore, a need exists for a novel system that can allow source independent but source value dependent transfer monitoring to overcome the foregoing shortcomings of the conventional system.

Accordingly, the present invention provides a technical solution to a technical problem. As described herein, the technical problem includes the user's loss of control and security of its resources when it is subject to multiple, recurring resource processing commitments from various sources or entities. In some cases, the user may experience a loss of control and security of its resources when it is subject to multiple, recurring resource processing commitments from a single source or entity. The technical solution presented herein allows for dynamic and secure blockage of unauthorized activities, such as unauthorized recurring resource processing commitments from various sources or entities, or from a single source. By allowing a user to engage in source independent, but source value dependent transfer monitoring of its resources, a user will be able to dynamically and securely block unauthorized activities. In this way, if a user elects to block all activities that are a specific resource processing value, when an entity transmits a processing interaction request consisting of a resource processing value to access a first resource of one or more resources associated with the user, the technical solution determines whether the resource processing value is associated with triggering the at least one block intervention step during processing of the first activity.

FIGS. 1A-1C illustrate technical components of an exemplary distributed computing environment for source independent but source value dependent transfer monitoring 100, in accordance with an embodiment of the invention. As shown in FIG. 1A, the distributed computing environment 100 contemplated herein may include a system 130, a client device(s) 140, and a network 110 over which the system 130 and client device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 described herein may perform some or all of the steps described herein.

In some embodiments, the system 130 and the client device(s) 140 may have a client-server relationship in which the client device(s) 140 are remote devices that request and receive service from a centralized server, i.e., the system 130. In some other embodiments, the system 130 and the client device(s) 140 may have a peer-to-peer relationship in which the system 130 and the client device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The client device(s) 140 may represent various forms of electronic devices, including user input devices such as personal digital assistants, cellular telephones, smartphones, laptops, desktops, and other similar computing devices.

In some embodiments, and as illustrated in FIG. 1A, the client device(s) 140 can further comprise user input devices 140a and 140b, an entity input device 140c, and a database 140d.

As used herein, the database 140d may be one or more distinct and/or remote databases. In some embodiments, the database 140d is not located within the system and is instead located remotely from the system. In some embodiments, the database 140d stores information or data described herein. It will be understood that the database 140d may include any one or more storage devices, including, but not limited to, datastores, databases, and/or any of the other storage devices typically associated with a computer system. It will also be understood that the database 140d may store information in any known way, such as, for example, by using one or more computer codes and/or languages, alphanumeric character strings, data sets, figures, tables, charts, links, documents, and/or the like. It will also be understood that, in some embodiments, the database 140d provides a substantially real-time representation of the information stored therein, so that, for example, the information stored therein is current or substantially current.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory (e.g. non-transitory storage devices) 104, and a low-speed interface 112 connecting to low speed bus 114 and storage device 106. Each of the components 102, 104, 106, 108, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the client device(s) 140, in accordance with an embodiment of the invention. As shown in FIG. 1C, the client device(s) 140 includes a processor 152, memory 154, an input/output device such as a display 156, a communication interface 158, and a transceiver 160, among other components. The client device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the client device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the client device(s) 140, such as control of user interfaces, applications run by client device(s) 140, and wireless communication by client device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of client device(s) 140 with other devices. External interface 168 may provide, for example, for wired communication in some implementations, or for wireless communication in other implementations, and multiple interfaces may also be used.

The memory 154 stores information within the client device(s) 140. The memory 154 can be implemented as one or more of a computer-readable medium or media, a volatile memory unit or units, or a non-volatile memory unit or units. Expansion memory may also be provided and connected to client device(s) 140 through an expansion interface (not shown), which may include, for example, a SIMM (Single In Line Memory Module) card interface. Such expansion memory may provide extra storage space for client device(s) 140 or may also store applications or other information therein. In some embodiments, expansion memory may include instructions to carry out or supplement the processes described above and may include secure information also. For example, expansion memory may be provided as a security module for client device(s) 140 and may be programmed with instructions that permit secure use of client device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the client device(s) 140 to transmit and/or receive information or commands to and from the system 130 via the network 110. Any communication between the system 130 and the client device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the client device(s) 140 may provide the system 130 (or other user input devices) permissioned access to the protected resources of the client device(s) 140, which may include a GPS device, an image capturing component (e.g., camera), a microphone, and/or a speaker.

The client device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to client device(s) 140, which may be used as appropriate by applications running thereon, and in some embodiments, one or more applications operating on the system 130.

The client device(s) 140 may also communicate audibly using audio codec 162, which may receive spoken information from a user and convert it to usable digital information. Audio codec 162 may likewise generate audible sound for a user, such as through a speaker, e.g., in a handset of client device(s) 140. Such sound may include sound from voice telephone calls, may include recorded sound (e.g., voice messages, music files, etc.) and may also include sound generated by one or more applications operating on the client device(s) 140, and in some embodiments, one or more applications operating on the system 130.

Various implementations of the distributed computing environment 100, including the system 130 and client device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 of user registration for source independent (e.g., independent of the entity) but source value dependent (e.g., dependent on the resource processing value and/or the blocking trigger value) transfer monitoring, in accordance with an embodiment of the invention. In some embodiments, user input devices 140*a* and 140*b* described previously may perform some or all steps described herein. In some embodiments, the system 130 described previously may perform some or all of the steps described herein.

As illustrated by block 202, the process 200 is initiated when the system electronically receives, from the user input device and via the end-user application, a security update request from the user to initiate a security update network session. In some embodiments, initiating the security update request includes activation of a particular key. In some embodiments, initiating the security update request requires the user to input authentication credentials. In some embodiments, the user input device includes a touchscreen and initiating the security update request includes activation of an icon displayed on the touchscreen. In some embodiments, the user input device includes a voice recognition system and initiating the security update request includes a user-created verbal phrase. In other embodiments, the user input device includes a biometric device and initiating the security update request includes biometric input entered through the biometric device. In some embodiments, initiating the security update request includes a combination of user inputs entered simultaneously.

In some embodiments, the end-user application interfaces with the user's digital wallet system. The user may submit resource transfer requests and security update requests via the user's digital wallet system.

Next, as illustrated by block 204, the process 200 continues when the system establishes the security update network session with the user input device via the end-user application in response to the security update request.

As illustrated by block 206, the process 200 continues by electronically receiving, via the security update network session, a network request to block access to one or more resources associated with the user for one or more activities that are associated with the at least one block intervention step. In this way, the user is pre-registering a request to block entity access to one or more resources associated with the user.

As illustrated in block 208, the process 200 continues by prompting, via the security update network session, the user input device to provide a first blocking trigger value associated with the at least one block intervention step. In some embodiments, the first blocking trigger value may be a resource value. Such first blocking trigger values may consist of entity identity, entity name, type of entity, resource processing value, type of transaction, type of goods purchased, types of services purchased, whether such transaction is recurring, and the like. In other embodiments, the first blocking trigger value may be a delay or a pause. The user may communicate via the security update network session that it seeks to pause any alteration to its resources, or initiate the block intervention step, for a specified number of minutes, hours, days, months, or years. After the user's designated time period, the block intervention step would cease, and the entity may be able to access the user's resources. The user may communicate via the security update network session that it seeks to pause any alteration to its resources based on an event, such as the monthly payment of rent. The first blocking trigger value could indicate that the user wishes to initiate the block intervention step a specified amount of time before or after the specified event, and once that time period comes to an end, the block intervention step ceases, and the entity may be able to access the user's resources.

As illustrated in block 210, the process 200 continues by electronically receiving, via the security update network session, the first blocking trigger value associated with the at least one block intervention step from the user at a first time interval. Typically, the first blocking trigger value is associated with a user resource. For example, the user may elect one of its one or more resources for the first blocking trigger value to apply to. In other embodiments, the user may elect that all of its resources be subject to the first blocking trigger value.

As illustrated in block 212, the process 200 continues by storing the first blocking trigger value associated with the at least one block intervention step in a database. The database may contain a variety of trigger values associated with the at least one block intervention step. The variety may consist of resource value based trigger values, merchant identity based trigger values, entity type based trigger values, or product or service based trigger values.

The process 200 may include additional embodiments, such as any single embodiment or any combination of embodiments described below and/or in connection with one or more processes described elsewhere herein.

In an embodiment, the process 200 continues by electronically receiving, via the security update network session and the user input device and via the end-user application, a second blocking trigger value associated with the at least one block intervention step and storing the second blocking trigger value associated with the at least one block intervention step. In this way, the process 200 may receive a first blocking trigger value, a second blocking trigger value, a third blocking trigger value, and so on from the user. There may be multiple blocking trigger values that are all stored within the database. There may be multiple blocking trigger values that are associated with resource values stored within the database. There may also be multiple blocking trigger values that are associated with specific entities or merchants stored within the database. There may also be multiple blocking trigger values that are associated with specific product or service types stored within the database.

In some embodiments, the blocking trigger value may be a delay. For example, the user may request that a merchant transaction be blocked for a certain number of days, that the user may specify. The delay could be tied to a specific event, such as the user's rent payment. This could permit the user to only allow the merchant to access the user's resources after the user's rent has been paid.

In another embodiment, the process 200 may continuously monitor requests (e.g. additional security update requests) to block access from the user or user input device.

In some embodiments, the process 200 may comprise additional security features. For instance, if the user indicates that it did not intend to block the entity's processing resource interaction, the user may flag the entity's processing resource interaction as unproblematic or authorized. In this regard, the system 130 may automatically undertake corrective action comprising providing additional information associated with the flagged interaction for the user's consideration. Upon the user's command to the system 130 to allow the previously blocked processing resource interaction, the system 130 will instantaneously allow the processing resourcing interaction to proceed and alter the user's resources. In other embodiments, the process 200 may transmit a notification to the entity input device to re-process the processing resource interaction, upon indication from the user that it allows the previously blocked processing resource interaction.

FIG. 3 illustrates a process flow 300 for source independent but source value dependent transfer monitoring, in accordance with an embodiment of the invention. In some embodiments, the system 130 described previously may perform some or all of the steps described herein.

As illustrated in block 302, the process 300 is initiated when the system electronically receives, from an entity input device and via an entity application, a first processing request to initiate a first processing network session, wherein the first processing network session is associated with the processing of a first activity associated with a user. Here, the entity may provide the processing request to initiate a processing network session via a point-of-transaction device (POT). The POT may be or include a merchant machine and/or server and/or may be or include the mobile device of the merchant. In some embodiments, the processing request may include one of the following: purchasing, renting, selling, and/or leasing goods and/or services (e.g., groceries, stamps, tickets, DVDs, vending machine items, or the like); withdrawing cash; making payments to creditors (e.g., paying monthly bills; paying federal, state, and/or local taxes and/or bills; or the like); sending remittances; transferring balances from one account to another account; loading money onto stored value cards (SVCs) and/or prepaid cards; donating to charities; and/or the like.

The entity input device may be a mobile POT device with smart interface interactivity for secure mobile transactions for the merchant or entity. The processing network session is a communicable linkage between the entity input device, the entity application and the user's resource repository institution. In some embodiments, the user's resource repository institution may be a financial institution.

A first activity associated with a user may be a transaction initiated by the user. The first activity may refer to a purchase of goods or services, a return of goods or services, a payment transaction, a credit transaction, or other interaction involving a user's resources. The first activity may have been initiated by the user in person, online or over the phone. The first activity may have been initiated immediately prior to the entity input device requesting to initiate the first processing network session. The first activity may have been initiated minutes, hours, days, months, or years prior to the entity input device requesting to initiate the first processing network session. The first activity may be a single transaction, or a recurring transaction. For example, the first activity may be a recurring transaction for a subscription service.

Next, as illustrated in block 304, the process 300 continues by establishing the processing network session with the entity input device via the entity application in response to the processing request. The entity application may be the interface with which the entity input device communicates via a wireless network. When the processing network session is established, the entity input device will be able to communicate with another entity, such as, for example, a financial institution that houses the user's resources.

Next, as illustrated in block 306, the process 300 continues by electronically receiving, via the processing network session, a processing interaction request to access a first resource of one or more resources associated with the user. Here, a processing interaction request may in the form of sending a request to a financial institution that houses the user's resources, in order to request a certain amount of resources from the user for a transaction. A processing interaction request may be a communication with another entity to fulfill a user's obligations with respect to various transactions. A processing interaction request may require authentication of the entity prior to allowing the entity to access the user's resources. In another embodiment, a processing interaction request may require authenticating the user prior to allowing the entity to access the user's resources. In another embodiment, the processing interaction request may require the user's approval in order to allow the entity to access the user's resources. Requesting approval from the user may consist of pushing a notification to the user's end-user application, sending the user a text, or calling the user.

As illustrated in block 308, the process 300 continues by prompting entity input device to provide one or more processing parameter data structures associated with the processing interaction request. In this way, the entity input device requests that the entity provide one or more processing parameter data structures associated with the processing interaction request. The processing parameter data structures may consist of entity name or identity, date, location, resource processing value, transaction value, time, type of purchase, number of items purchased, type of service purchased, whether the transaction is recurring, and other variables.

As illustrated in block 310, the process 300 continues by extracting a resource processing value associated with the first activity from the processing parameter data structure. If a user has submitted to the system, a first blocking trigger value associated with at least one block intervention step, the process 300 will extract the same type of resource processing value that corresponds to the first blocking trigger value submitted by the user. For example, if the user submits a first blocking trigger value that consists of a specific merchant's name, the process 300 will extract a resource processing value from the processing parameter data structure that corresponds to the merchant's name. In another example, if the user submits a first blocking trigger value that consists of a specific resource value, then the process 300 will extract a resource processing value from the processing parameter data structure that corresponds with a resource value.

As illustrated in block 312, the process 300 continues by determining whether the resource processing value associated with the processing interaction request is associated with triggering at least one block intervention step during processing of the first activity. In this way, the process 300 may determine whether the resource processing value is an exact match with the processing interaction request associated with triggering at least one block intervention step during processing of the first activity.

In one embodiment, the process 300 determines whether the resource processing value is associated with the processing interaction request by extracting the first blocking trigger value from the database; and identifying whether the extracted first blocking trigger value input by the user at the first time interval preceding a second time interval matches the resource processing value. For example, the difference between the first time interval and the second time interval could be a second, a few seconds, a minute, a few minutes, an hour, a few hours, a day, a few days, a week, a few weeks, a month, a few months, a year, or a few years. The first time interval can be any amount of time preceding the second time interval.

In another embodiment, the process 300 determines whether the resource processing value is associated with the first blocking trigger value during processing of the first activity by identifying a successful match between the extracted resource processing value and the first blocking trigger value; blocking the entity input device from accessing the first resource in response to identifying the successful match between the extracted resource processing value and the first blocking trigger value; and transmitting the block notification to the entity input device.

As illustrated in block 314, the process 300 continues by blocking the entity input device from accessing the first resource in response to determining that the resource processing value is associated with triggering the at least one block intervention step during processing of the first activity. If the resource processing value is an exact match with the first blocking trigger value established by the user, the process 300 will block the entity input device from accessing user resources. If the resource processing value is not an exact match with the first blocking trigger value established by the user, the process 300 will not block the entity input device from accessing user resources, and the entity input device may process its processing interaction request. For example, if the resource processing value differs from the first blocking trigger value by one cent, the process 300 will not block the entity input device from accessing user resources.

As illustrated in block 316, the process 300 continues by transmitting a block notification to the entity input device. The block notification may be an alert to the entity input device indicating that the processing interaction request has failed or has been blocked. In some embodiments, the block notification may comprise transmitting instructions to the entity input device to contact the user or another entity. In some embodiments, the block notification may appear within the entity application. In other embodiments, the block notification may comprise an email or a text or other suitable written alerts. The block notification may comprise visual representations of the blocked processing interaction request. In some embodiments, the transmitted signals may cause alerts to be presented via auxiliary/secondary entity devices connected to the entity input device, for example, by modifying the illumination of lighting devices, modifying the sound volume/content of speaker devices, and the like to obtain the entity's attention.

As illustrated in block 318, the process 300 continues by triggering display of success notification at an end-user application associated with the user input device. In some embodiments, at every block intervention step, the system may initiate transmission of alerts/notifications to the mobile device of the user indicating completion or success of the blocked event. In some embodiments, transmitting alerts may comprise transmitting control instructions that cause the end-user application to present the appropriate content/interfaces. For example, the end-user application may be running in the background on the user's mobile device, and the transmitted instructions may cause the end-user application to present a block intervention step notice or alert on a display associated with the mobile device to alert the user and may cause the mobile device to further present auditory and/or vibratory alerts. In other instances, the system may determine that the mobile device is offline and may then transmit alerts (via text messages, near field communication or other suitable means) that are configured to cause the mobile device to connect to a suitable network, Wi-Fi, internet and the like. The block intervention step alert or notice may comprise visual representation of details of the blocked event, new/current resource levels, previous resource levels, images of the users/resources/entities involved in the transfer and associated text. In some embodiments, the transmitted signals may cause alerts to be presented via auxiliary/secondary user devices connected to the mobile device, for example, by modifying the illumination of lighting devices, modifying the sound volume/content of speaker devices, and the like to obtain the user's attention.

The process 300 may include additional embodiments, such as any single embodiment or any combination of embodiments described below and/or in connection with one or more processes described elsewhere herein.

In some embodiments, the process 300 may electronically receive, from an entity input device and via an entity application, a second processing request to initiate a second processing network session, wherein the second processing network session is associated with the processing of a second activity associated with a user; establish the second processing network session with the entity input device via the entity application in response to the second processing request; electronically receive, via the second processing network session, a second processing interaction request to access a first resource of one or more resources associated with the user; prompt the entity input device to provide one or more processing parameter data structures associated with the interaction request; extract a resource processing value associated with the second activity from the processing parameter data structure; determine whether the resource processing value associated with the second processing interaction request is associated with triggering at least one block intervention step during processing of the second activity; allow the entity input device to access the first resource in response to determining that the resource processing value is associated with triggering the at least one block intervention step during processing of the second activity; transmit a confirmation notification to the entity input device; and trigger display of a completion notification at the end-user application associated with the user input device.

In this way, if the resource processing value differs by one cent as compared to the value that triggers the at least one block intervention step, the process 300 proceeds to completion and allows the entity input device to access the user's resource(s).

In some embodiments, the confirmation notification may appear within the entity application. In other embodiments, the confirmation notification may comprise an email or a text or other suitable written alerts. The confirmation notification may comprise visual representations of the allowed processing interaction request. In some embodiments, the transmitted signals may cause alerts to be presented via auxiliary/secondary entity devices connected to the entity input device, for example, by modifying the illumination of lighting devices, modifying the sound volume/content of speaker devices, and the like to obtain the entity's attention.

In some embodiments, the completion notification may appear within the end-user application. In other embodiments, the completion notification may comprise an email or a text or other suitable written alerts. The completion notification may comprise visual representations of the allowed processing interaction request. In some embodiments, the transmitted signals may cause alerts to be presented via auxiliary/secondary entity devices connected to the entity input device, for example, by modifying the illumination of lighting devices, modifying the sound volume/content of speaker devices, and the like to obtain the entity's attention.

In another embodiment, the process 300 may continuously monitor requests to block access from the user input device. The requests from the user input device may be requests to block entity access by limiting the resource processing value of the entity's processing interaction requests. In some embodiments, the requests from the user input device may be based on specific entity identifier or identification, rather than a resource processing value. In other embodiments, the requests from the user input device may consist of a location limitation. In other embodiments, the requests from the user input device may consist of a product or service limitation.

In some embodiments, the process 300 may comprise additional security features. For instance, if the user indicates that it did not intend to block the entity's processing resource interaction, the user may flag the entity's processing resource interaction as unproblematic or authorized. In this regard, the system 130 may automatically undertake corrective action comprising providing additional information associated with the flagged interaction for the user's consideration. Upon the user's command to the system 130 to allow the previously blocked processing resource interaction, the system 130 will instantaneously allow the processing resourcing interaction to proceed and alter the user's resources. In other embodiments, the system 130 may transmit a notification to the entity input device to re-process the processing resource interaction, upon indication from the user that it allows the previously blocked processing resource interaction.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for source independent but source value dependent transfer monitoring, wherein the system is structured for adapting user systems for dynamically and securely blocking unauthorized activities, the system comprising:
   at least one non-transitory storage device; and
   at least one processor coupled to the at least one non-transitory storage device, wherein the at least one processor is configured to:
   electronically receive, from an entity input device and via an entity application, a first processing request to initiate a first processing network session, wherein the first processing network session is associated with the processing of a first activity associated with a user;
   establish the processing network session with the entity input device via the entity application in response to the processing request;
   electronically receive, via the processing network session, a processing interaction request to access a first resource of one or more resources associated with the user;
   prompt the entity input device to provide one or more processing parameter data structures associated with the interaction request;
   extract a resource processing value associated with the first activity from the processing parameter data structure;
   determine whether the resource processing value associated with the processing interaction request is associated with triggering at least one block intervention step during processing of the first activity;
   block the entity input device from accessing the first resource in response to determining that the resource processing value is associated with triggering the at least one block intervention step during processing of the first activity;
   transmit a block notification to the entity input device; and
   trigger display of a success notification at an end-user application associated with a user input device.

2. The system of claim 1, wherein the at least one processor is further configured to:
   electronically receive, from the user input device and via the end-user application, a security update request from the user to initiate a security update network session;
   establish the security update network session with the user input device via the end-user application in response to the security update request;
   electronically receive, via the security update network session, a network request to block access to one or more resources associated with the user for one or more activities that are associated with the at least one block intervention step;
   prompt, via the security update network session, the user input device to provide a first blocking trigger value associated with the at least one block intervention step;
   electronically receive, via the security update network session, the first blocking trigger value associated with the at least one block intervention step from the user at a first time interval; and
   store the first blocking trigger value associated with the at least one block intervention step in a database.

3. The system of claim 2, wherein the request to initiate the processing network session is received at a second time interval following the first time interval, wherein determining whether the resource processing value is associated with the first blocking trigger value associated with the at least one block intervention step during processing of the first activity comprises:
   extracting the first blocking trigger value from the database; and
   identifying whether the extracted first blocking trigger value input by the user at the first time interval preceding a second time interval matches the resource processing value.

4. The system of claim 3, wherein determining whether the resource processing value is associated with the first blocking trigger value during processing of the first activity comprises:
   identifying a successful match between the extracted resource processing value and the first blocking trigger value;
   blocking the entity input device from accessing the first resource in response to identifying the successful match between the extracted resource processing value and the first blocking trigger value; and
   transmitting the block notification to the entity input device.

5. The system of claim 2, wherein the at least one processor is further configured to continuously monitor requests to block access from the user input device.

6. The system of claim 2, wherein the at least one processor is further configured to:
electronically receive, via the security update network session and the user input device and via the end-user application, a second blocking trigger value associated with the at least one block intervention step; and
store the second blocking trigger value associated with the at least one block intervention step in the database.

7. The system of claim 1, wherein the at least one processor is further configured to:
electronically receive, from an entity input device and via an entity application, a second processing request to initiate a second processing network session, wherein the second processing network session is associated with the processing of a second activity associated with a user;
establish the second processing network session with the entity input device via the entity application in response to the second processing request;
electronically receive, via the second processing network session, a second processing interaction request to access a first resource of one or more resources associated with the user;
prompt the entity input device to provide one or more processing parameter data structures associated with the interaction request;
extract a resource processing value associated with the second activity from the processing parameter data structure;
determine whether the resource processing value associated with the second processing interaction request is associated with triggering at least one block intervention step during processing of the second activity;
allow the entity input device to access the first resource in response to determining that the resource processing value is associated with triggering the at least one block intervention step during processing of the second activity;
transmit a confirmation notification to the entity input device; and
trigger display of a completion notification at the end-user application associated with the user input device.

8. A computer program product for source independent but source value dependent transfer monitoring, wherein the computer program product is structured for adapting entity systems for dynamically and securely blocking unauthorized activities, the computer program product comprising a non-transitory computer-readable medium comprising code causing a first apparatus to:
electronically receive, from an entity input device and via an entity application, a first processing request to initiate a first processing network session, wherein the first processing network session is associated with the processing of a first activity associated with a user;
establish the first processing network session with the entity input device via the entity application in response to the first processing request;
electronically receive, via the first processing network session, a first processing interaction request to access a first resource of one or more resources associated with the user;
prompt the entity input device to provide one or more processing parameter data structures associated with the interaction request;
extract a resource processing value associated with the first activity from the processing parameter data structure;
determine whether the resource processing value associated with the first processing interaction request is associated with triggering at least one block intervention step during processing of the first activity;
block the entity input device from accessing the first resource in response to determining that the resource processing value is associated with triggering the at least one block intervention step during processing of the first activity;
transmit a block notification to the entity input device; and
trigger display of a success notification at an end-user application associated with a user input device.

9. The computer program product of claim 8, wherein the non-transitory computer-readable medium further comprises:
electronically receive, from the user input device and via the end-user application, a security update request from the user to initiate a security update network session;
establish the security update network session with the user input device via the end-user application in response to the security update request;
electronically receive, via the security update network session, a network request to block access to one or more resources associated with the user for one or more activities that are associated with the at least one block intervention step;
prompt, via the security update network session, the user input device to provide a first blocking trigger value associated with the at least one block intervention step;
electronically receive, via the security update network session, the first blocking trigger value associated with the at least one block intervention step from the user at a first time interval; and
store the first blocking trigger value associated with the at least one block intervention step in a database.

10. The computer program product of claim 9, wherein determining whether the resource processing value is associated with the first blocking trigger value associated with the at least one block intervention step during process of the first activity comprises:
extracting the first blocking trigger value from the database; and
identifying whether the extracted first blocking trigger value input by the user at the first time interval preceding a second time interval matches the resource processing value.

11. The computer program product of claim 10, wherein determining whether the resource processing value is associated with the first blocking trigger value associated with the at least one block intervention step during processing of the first activity comprises:
identifying a successful match between the extracted resource processing value and the first blocking trigger value;
blocking the entity input device from accessing the first resource in response to identifying the successful match between the extracted resource processing value and the first blocking trigger value; and
transmitting the block notification to the entity input device.

12. The computer program product of claim 8, wherein the non-transitory computer-readable medium further comprises continuously monitoring requests to block access from the user input device.

13. The computer program product of claim 9, wherein the non-transitory computer-readable medium is further configured to:

electronically receive, via the security update network session and the user input device and via the end-user application, a second blocking trigger value associated with the at least one block intervention step; and store the second blocking trigger value associated with the at least one block intervention step in the database.

14. The computer program product of claim 8, wherein the non-transitory computer-readable medium is further configured to:

electronically receive, from an entity input device and via an entity application, a second processing request to initiate a second processing network session, wherein the second processing network session is associated with the processing of a second activity associated with a user;

establish the second processing network session with the entity input device via the entity application in response to the second processing request;

electronically receive, via the second processing network session, a second processing interaction request to access a first resource of one or more resources associated with the user;

prompt the entity input device to provide one or more processing parameter data structures associated with the interaction request;

extract a resource processing value associated with the second activity from the processing parameter data structure;

determine whether the resource processing value associated with the second processing interaction request is associated with triggering at least one block intervention step during processing of the second activity;

allow the entity input device to access the first resource in response to determining that the resource processing value is associated with triggering the at least one block intervention step during processing of the second activity;

transmit a confirmation notification to the entity input device; and trigger display of a completion notification at the end-user application associated with the user input device.

15. A method for source independent but source value dependent transfer monitoring, the method comprising:

electronically receiving, from an entity input device and via an entity application, a first processing request to initiate a first processing network session, wherein the first processing network session is associated with the processing of a first activity associated with a user;

establishing the first processing network session with the entity input device via the entity application in response to the first processing request;

electronically receiving, via the first processing network session, a first processing interaction request to access a first resource of one or more resources associated with the user;

prompting the entity input device to provide one or more processing parameter data structures associated with the interaction request;

extracting a resource processing value associated with the first activity from the processing parameter data structure;

determining whether the resource processing value associated with the first processing interaction request is associated with triggering at least one block intervention step during processing of the first activity;

blocking the entity input device from accessing the first resource in response to determining that the resource processing value is associated with triggering the at least one block intervention step during processing of the first activity;

transmitting a block notification to the entity input device; and triggering display of a success notification at an end-user application associated with a user input device.

16. The method of claim 15, wherein the method further comprises:

electronically receiving, from the user input device and via the end-user application, a security update request from the user to initiate a security update network session;

establishing the security update network session with the user input device via the end-user application in response to the security update request;

electronically receiving, via the security update network session, a network request to block access to one or more resources associated with the user for one or more activities that are associated with the at least one block intervention step;

prompting, via the security update network session, the user input device to provide a first blocking trigger value associated with the at least one block intervention step;

electronically receiving, via the security update network session, the first blocking trigger value associated with the at least one block intervention step from the user at a first time interval; and storing the first blocking trigger value associated with the at least one block intervention step in a database.

17. The method of claim 16, wherein determining whether the resource processing value is associated with the first blocking trigger value associated with the at least one block intervention step during process of the first activity comprises:

extracting the first blocking trigger value from the database; and identifying whether the extracted first blocking trigger value input by the user at the first time interval preceding a second time interval matches the resource processing value.

18. The method of claim 17, wherein determining whether the resource processing value is associated with the first blocking trigger value associated with the at least one block intervention step during processing of the first activity comprises:

identifying a successful match between the extracted resource processing value and the first blocking trigger value;

blocking the entity input device from accessing the first resource in response to identifying the successful match between the extracted resource processing value and the first blocking trigger value; and transmitting the block notification to the entity input device.

19. The method of claim 16, wherein the method further comprises continuously monitoring requests to block access from the user input device.

20. The method of claim 16, wherein the method further comprises:

electronically receiving, via the security update network session and the user input device and via the end-user application, a second blocking trigger value associated with the at least one block intervention step; and storing the second blocking trigger value associated with the at least one block intervention step in the database.

\* \* \* \* \*